(12) United States Patent
Klimov

(10) Patent No.: US 12,670,428 B2
(45) Date of Patent: Jun. 30, 2026

(54) DENOISING QUBIT CALIBRATION DATA WITH DEEP LEARNING

(71) Applicant: Google LLC, Mountain View, CA (US)

(72) Inventor: Paul Victor Klimov, Santa Barbara, CA (US)

(73) Assignee: GOOGLE LLC, Mountain View, CA (US)

( * ) Notice: Subject to any disclaimer, the term of this patent is extended or adjusted under 35 U.S.C. 154(b) by 1056 days.

(21) Appl. No.: 17/784,158

(22) PCT Filed: Dec. 4, 2020

(86) PCT No.: PCT/US2020/063196
§ 371 (c)(1),
(2) Date: Jun. 10, 2022

(87) PCT Pub. No.: WO2021/118867
PCT Pub. Date: Jun. 17, 2021

(65) Prior Publication Data
US 2023/0029092 A1       Jan. 26, 2023

Related U.S. Application Data

(60) Provisional application No. 62/946,038, filed on Dec. 10, 2019.

(51) Int. Cl.
*G06N 10/60* (2022.01)
*G06N 3/045* (2023.01)
*G06N 3/088* (2023.01)

(52) U.S. Cl.
CPC ............. *G06N 10/60* (2022.01); *G06N 3/045* (2023.01); *G06N 3/088* (2013.01)

(58) Field of Classification Search
CPC ......... G06N 10/60; G06N 3/045; G06N 3/088
See application file for complete search history.

(56) References Cited

U.S. PATENT DOCUMENTS 11,803,772 B2     10/2023   Dukatz et al.
2017/0357561 A1*  12/2017   Kelly ..................... G06N 10/70

FOREIGN PATENT DOCUMENTS

CN            105718931 B   *  8/2020  ........... G06V 10/993
WO       WO2019117955         6/2019

OTHER PUBLICATIONS

Bondarenko et al., "Quantum Autoencoders to Denoise Quantum Data", arxiv.org, Oct. 21, 2019, XP081518268, 8 pages.

(Continued)

*Primary Examiner* — Li Wu Chang
(74) *Attorney, Agent, or Firm* — DORITY & MANNING P.A.

(57) ABSTRACT

Systems and methods for calibrating a qubit parameter for a qubit in a quantum computing system are provided. In one example, a method includes obtaining, by one or more computing devices, data associated with a set of one or more qubit parameters for a qubit in a quantum computing system. The method includes obtaining, by the one or more computing devices, calibration data associated with at least one qubit parameter in the set of one or more qubit parameters. The method includes determining, by the one or more computing devices, a value for the at least one qubit parameter based at least in part on the calibration data using a de-corrupting autoencoder.

20 Claims, 11 Drawing Sheets

(56)         References Cited

OTHER PUBLICATIONS

International Search Report for Application No. PCT/US2020/063196, mailed on Mar. 25, 2021, 3 pages.

Pepper et al., "Experimental Realization of a Quantum Autoencoder: The Compression of Qutrits via Machine Learning", arXiv:1810.01637v2, dated Feb. 15, 2019, 7 pages.

Romero et al., "Quantum autoencoders for efficient compression of quantum data", Quantum Science and Technology, vol. 2, No. 4, 2017, 16 pages.

Chinese Search Report Corresponding to Application No. 2020800953114 on Dec. 17, 2024.

\* cited by examiner

450

DENOISING QUBIT CALIBRATION DATA WITH DEEP LEARNING

PRIORITY CLAIM

This application is based upon and claims the right of priority under 35 U.S.C. § 371 to International Application No. PCT/US2020/063196, filed on Dec. 4, 2020, which claims the benefit of priority of U.S. Provisional Patent Application Ser. No. 62/946,038, titled "Denoising Qubit Calibration Data with Deep Learning," filed on Dec. 10, 2019. Applicant claims priority to and the benefit of each of such applications and incorporate all such applications herein by reference in its entirety.

FIELD

The present disclosure relates generally to quantum computing systems.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as $a |0\rangle + b |1\rangle$. The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a method for calibrating a qubit parameter for a qubit in a quantum computing system are provided. In one example, a method includes obtaining, by one or more computing devices, data associated with a set of one or more qubit parameters for a qubit in a quantum computing system. The method includes obtaining, by the one or more computing devices, calibration data associated with at least one qubit parameter in the set of one or more qubit parameters. The method includes determining, by the one or more computing devices, a value for the at least one qubit parameter based at least in part on the calibration data using a de-corrupting autoencoder.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
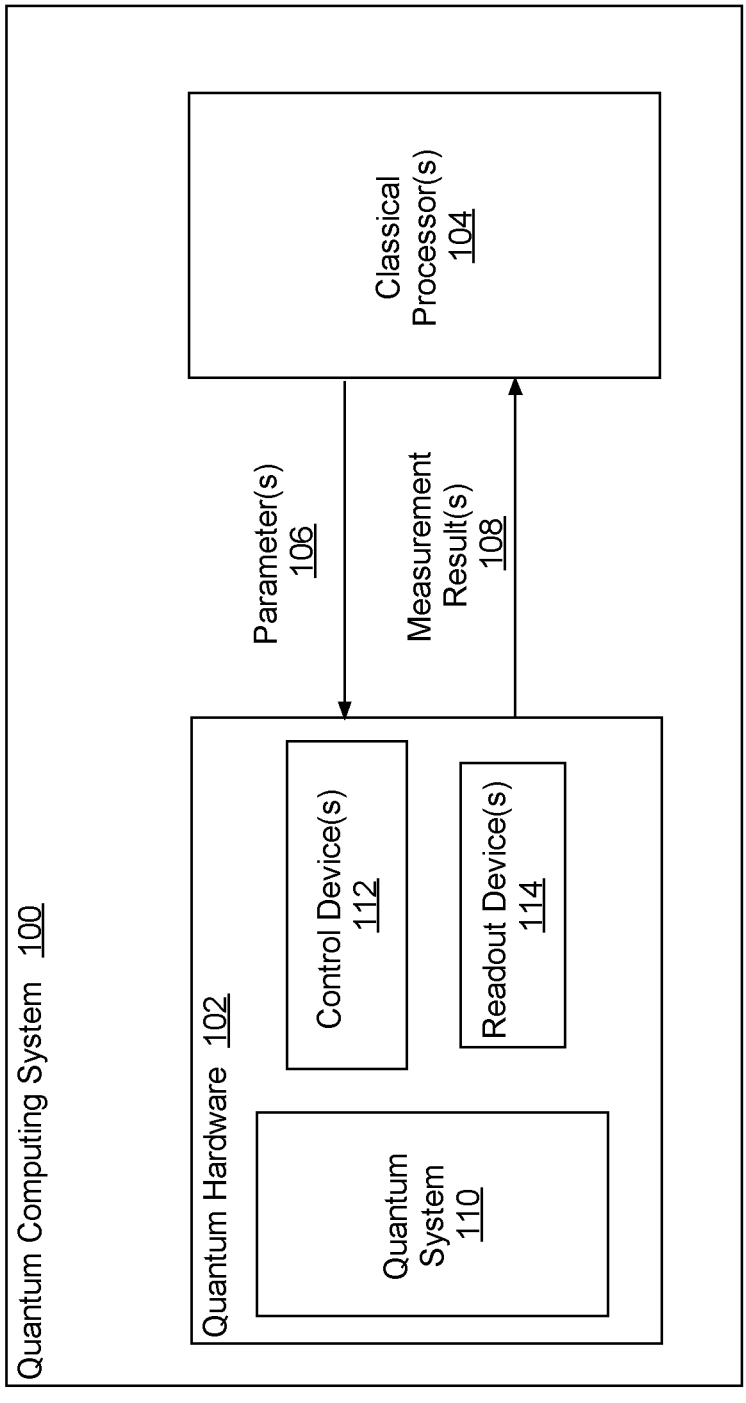
FIG. 1 depicts an example quantum computing system according to example embodiments of the present disclosure.

Example aspects of the present disclosure are directed to systems and methods for calibrating a qubit in a quantum computing system. For instance, de-corrupting autoencoder(s) can be trained to process qubit calibration data to remove random noise, masking noise, or other noise from qubit calibration data during a qubit calibration process. In this way, the de-corrupting autoencoder can improve the reliability of qubit calibration process(es), leading to enhanced performance of quantum computing systems. The disclosure further encompasses a method of operating the quantum computing system in dependence on qubit parameters determined from the qubit calibration data, and a quantum computing system configured to operate in this manner.

Performing quantum computations with high fidelity can require precise calibration of qubit parameters for qubits in a quantum computing system. Example qubit parameters can include, for instance, qubit-circuit parameters, qubit-control parameters, and/or qubit-readout parameters. Qubit calibration processes can be implemented as a bootstrapping procedure in which multiple calibration experiments are implemented on the qubit to obtain calibration data for the qubit parameter. The multiple calibration experiments are iteratively performed until the calibration data is determined to meet one or more specifications or other requirements so that the qubit parameters are learned with increasing precision. At early stages of the calibration process, qubit parameters are not known with high precision. As such, calibration data obtained during the calibration experiments can be corrupted due to, for instance, random noise attributable to imperfect knowledge of the qubit parameters associated with qubit readout. Corrupted calibration data can reduce the reliability and/or speed of the calibration process.

Example aspects of the present disclosure can employ machine-learned de-corrupting autoencoder(s) to reconstruct calibration data that may be corrupted due to noise. The de-corrupting autoencoders can include deep neural networks that process calibration data to remove and/or reduce noise in the calibration data. This can improve the reliability of the calibration process, particularly at early stages of the calibration process.

In some implementations, qubit calibration can be abstracted into a graph traversal problem. In this case, data associated with a set of qubit parameter(s) can be represented as a directed graph. The nodes of the directed graph can represent individual qubit parameters for the qubit to be calibrated. The directed edges can represent dependencies among the qubit parameters.

The calibration process can be implemented according to a node ancestry ordering for the directed graph. At the root of the directed graph, qubit parameters have not been learned and a qubit is uncalibrated. After all nodes of the graph have been traversed and calibrations successfully completed (e.g., qubit parameters meet specification(s)), the qubit is calibrated. The construction of the directed graph can be arbitrary.

An example calibration process can include for each qubit: starting with the qubit parameter associated with the root node; obtaining calibration data for the qubit parameter; analyzing the calibration data; and determining whether the qubit parameter passes or fails a calibration test. As used herein, a calibration test can be implemented by using a discriminator operation that assesses whether the calibration data is within or outside of specification(s). When the calibration data passes the calibration test, value(s) for the qubit parameter associated with the root node are set. The process proceeds to the next node in the directed graph where the process is repeated until the entire directed graph has been traversed. When the calibration data does not pass the calibration test, the process returns to a previous node in the directed graph to repeat the calibration process for the previous node.

To address any corruption of calibration data during the calibration process, aspects of the present disclosure can implement a machine-learned de-corrupting autoencoder to reconstruct a de-corrupted version of the calibration data. An autoencoder is a deep neural network architecture that can be used to learn latent features within a dataset within an unsupervised learning framework. An autoencoder can include an encoder network that encodes a dataset into a latent representation or code. The autoencoder includes a decoder network that decodes the latent representation or code to reconstruct the dataset from the latent representation or code. Both the encoder network and the decoder network can be implemented as feed-forward neural networks with a plurality of fully connected layers that can be trained using backpropagation. The encoder network down-converts the input dataset into a latent-space representation that can be of lower dimension than the dataset. The decoder network up-converts the latent representation into a reconstruction of the input dataset. During training of the autoencoder, the encoder network and/or the decoder network is penalized for poorly reconstructing the input dataset.

A de-corrupting autoencoder can be trained for data de-corruption (e.g., to reduce noise or other sources of corruption in the data). More particularly, the autoencoder can be trained on both good datasets and intentionally corrupted training datasets (e.g., datasets, such as images, having random speckle noise or masking noise). The encoder network and/or the decoder network can be penalized for not reconstructing a non-corrupted input dataset.

According to example aspects of the present disclosure, a de-corrupting autoencoder can be trained to de-corrupt calibration data for one or more qubit parameters. In some embodiments, a unique de-corrupting autoencoder can be trained for each unique qubit parameter. The de-corrupting autoencoders can be implemented in the calibration process to reduce errors in qubit calibration.

In some embodiments, the calibration process can include performing a first calibration test on the calibration data for a qubit parameter. If the calibration data passes the first calibration test, the process can set value(s) for the qubit parameter and proceed on to the next calibration (e.g., next node in a directed graph). If the calibration data fails or does not pass the first calibration test, the calibration process can determine whether the calibration data has already been reconstructed using a de-corrupting autoencoder (e.g., based on metadata associated with the calibration data). If so, the calibration process can return to a previous qubit parameter (e.g., previous node in a directed graph). If the calibration data has not previously been reconstructed, the calibration process can provide the calibration data to the de-corrupting autoencoder. The calibration data can be processed using the de-corrupting autoencoder to generate reconstructed calibration data. The calibration process can perform a second calibration test on the reconstructed calibration data. In some embodiments, the first calibration test and the second calibration test can be performed using the same discriminator operation to determine if the calibration data meets specification(s). If the reconstructed calibration data passes the second calibration test, the process can set value(s) for the qubit parameter. If the reconstructed calibration data does not pass the second calibration test, the process can return to a previous qubit parameter (e.g., previous node in a directed graph).

In some embodiments, the calibration process for a qubit parameter can initially include processing the calibration data to determine if it is corrupted. For instance, the calibration data can be subjected to a signal-to-noise classifier and/or a machine learned classifier model to determine if the calibration data should be reconstructed using a de-corrupting autoencoder. If so, the calibration process can provide the calibration data to the de-corrupting autoencoder. The calibration data can be processed using the de-corrupting autoencoder to generate reconstructed calibration data. The calibration process can perform a calibration test on the reconstructed calibration data. If the reconstructed calibration data passes the calibration test, the process can set value(s) for the qubit parameter. If the reconstructed calibration data does not pass the calibration test, the process can return to a previous qubit parameter (e.g., previous node in a directed graph).

Example aspects of the present disclosure can provide technical effects and benefits and can provide improvements to quantum computing systems. For instance, implementing a de-corrupting autoencoder to reconstruct calibration data during a qubit calibration process can enhance the robustness, speed, and/or reliability of the qubit calibration process in a quantum computing system. The quality of the calibration procedure can be improved. In addition, the time required to successfully calibrate a qubit parameter can be reduced. Accordingly, computational performance of a system implementing qubit calibration can be increased while reducing computational costs. Further, the increased accuracy in qubit calibration can lead to more accurate processing of qubits in the quantum computing system.

With reference now to the FIGS., example embodiments of the present disclosure will be discussed in further detail. As used here, the use of the term "about" in conjunction with a value refers to within 20% of the value.

FIG. 1 depicts an example quantum computing system 100. The example system 100 is an example of a system implemented as classical or quantum computer program on one or more classical computers or quantum computing devices in one or more locations, in which the systems, components, and techniques described below can be implemented. FIG. 1 depicts an example quantum computing system that can be used to implement aspects of the present disclosure. Those of ordinary skill in the art, using the disclosures provided herein, will understand that other quantum computing structures or systems can be used without deviating from the scope of the present disclosure.

The system 100 includes quantum hardware 102 in data communication with one or more classical processors 104. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits. In some implementations, the multi-level quantum subsystems can include superconducting qubits, such as flux qubits, charge qubits, transmon qubits, gmon qubits, etc.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum logic gates or circuits of quantum logic gates, e.g., Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust a frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulse) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

The readout device(s) 114 can take advantage of a difference in the impedance for the $|0\rangle$ and $|1\rangle$ states of an element of the quantum system, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

Figure 2:
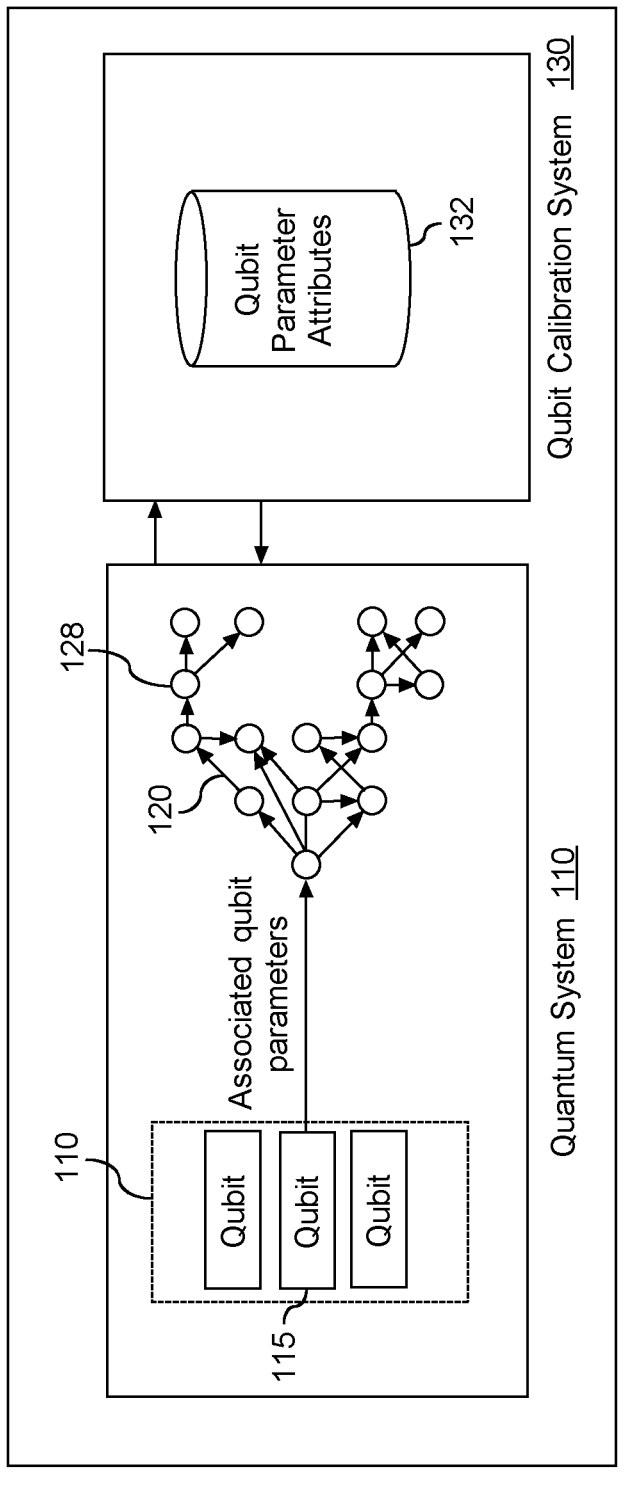
FIG. 2 depicts example qubit calibration according to example embodiments of the present disclosure.

FIG. 2 depicts an example system for automatic qubit calibration. The example system is an example of a system implemented as classical or quantum computer programs on one or more classical computers or quantum computing devices in one or more locations, in which the systems, components, and techniques described below can be implemented.

The system includes a quantum computing system 100 (e.g., FIG. 1) in communication with a qubit calibration system 130 and a qubit and parameter attribute data store 132. The qubit calibration system 130 is also in communication with the qubit and parameter attribute data store 132.

The quantum computing system 100 includes a quantum system 110 having one or more qubits 115. The one or more qubits 115 may be used to perform algorithmic operations or quantum computations. The specific realization of the one or more qubits 115 depends on the type of algorithmic operations or quantum computations that the quantum computing system 100 is performing. For example, the qubits 115 may include qubits that are realized via atomic, molecular or solid-state quantum systems. In other examples the qubits 115 may include, but are not limited to, superconducting qubits or semi conducting qubits. For illustration, three qubits 115 are depicted in FIG. 2, however the system may include any number of qubits.

Each qubit 115 may be associated with multiple qubit parameters. Qubit parameters may include values used in a parameterized quantum gate, e.g., voltage amplitude for a pi pulse or frequency of a readout pulse. For example, to tune a superconducting qubit, (e.g., dispersively coupled to a readout resonator using pi and pi/2 rotations and single shot readout to discriminate between the 0 and 1 states), the superconducting qubit may be associated with multiple parameters including: readout pulse frequency, readout pulse length, readout pulse power, readout discrimination threshold to discriminate between the 0 and 1 states based on the readout signal, pi rotation qubit frequency, pi/2 rotation qubit frequency, pi pulse length, pi/2 pulse length, pi pulse amplitude and pi/2 pulse amplitude. Some or all of the parameters associated with a qubit may require experimental determination for calibration. For example, in the above list of qubit parameters, the readout pulse frequency, readout pulse power, readout discrimination threshold to discriminate between the 0 and 1 states based on the readout signal, pi rotation qubit frequency, pi/2 rotation qubit frequency, pi pulse amplitude and pi/2 pulse amplitude may require experimental determination. Other parameters may be set a priori.

The multiple qubit parameters may in turn be associated with one or more parameter attributes. The parameter attributes are dependent on the physical realization of the respective qubit 115. For example, the parameter attributes for a qubit parameter may include acceptable values of the qubit parameter, (e.g., acceptable values used in a parameterized quantum gate). If a qubit parameter value is determined to be an acceptable value, or if the qubit parameter value is determined to lie within a tolerance value of what is accepted, the qubit parameter may be determined as being within specification. If a qubit value is determined to be an unacceptable value, the qubit parameter may be determined as being out of specification. For example, a pi pulse parameter may be determined to be in specification if the rotation angle is within the tolerance value of about 1% of a 180 degree rotation. A qubit parameter that is out of specification may require calibration in order to ensure that the qubit parameter is within specification.

In another example, the parameter attributes for a qubit parameter may include a measure of the stability of the parameter, or the drift time of the parameter. After calibration, a qubit parameter may naturally drift out of specification due to external factors such as temperature. The parameter attributes may therefore include a respective timeout period which indicates a time period for which a parameter value should be checked or calibrated.

As another example, the parameter attributes for a qubit parameter may include the dependencies of a qubit parameter on other qubit parameters. A qubit parameter may depend on at least one other qubit parameter and the calibration of the at least one other qubit parameter. For example, the qubit may be an atom and the parameters of the qubit may be calibrated using Rabi driving. There may be a number of parameters which must be previously calibrated for Rabi driving to run correctly. For example, Rabi driving may need to be performed at the qubit frequency, which must be determined in a different calibration experiment, and the qubit state must be measured using a readout operation which must itself be calibrated. Therefore, due to these parameter dependencies, before Rabi driving is performed, the qubit frequency calibration and readout operation should be calibrated.

In some implementations, the qubit parameters may be represented by a directed graph comprising a node for each parameter, e.g., node 128, and a directed edge for each dependency, e.g., directed edge 120. For example, for a superconducting qubit as described above, the readout threshold parameter to discriminate between the 0 and 1 state may be represented by a node that is connected to a node representing a pi pulse parameter with a directed edge indicating that the readout threshold parameter is dependent on the pi pulse parameter. As another example, a node that requires a pi pulse will be connected to a node that calibrated the pi pulse amplitude, since a node that requires a pi pulse may depend on a node that calibrates the pi pulse amplitude. Each node in the directed graph may have an associated parameter and one or more associated calibration experiments that may be used to determine a correct value for the parameter associated with the node. As depicted in FIG. 2, each qubit 115 may be associated with a number of qubit parameters. For clarity a restricted number of qubit parameters are shown, however a qubit 115 may be associated with a smaller or larger number of qubit parameters.

The directed graph may include one or more root nodes (e.g., nodes with no dependencies). A root node defines a root or "ancestor" direction of the graph (e.g., the direction towards the root nodes with no dependencies) and a leaf or "child" direction of the graph (e.g., towards nodes that are dependent or deeper in the graph.)

The qubit calibration system 130 may include a classical or quantum processing device implemented as part of and/or communicates with the quantum computing system 100. The qubit calibration system 130 may be configured to obtain a set of qubit parameters and data describing one or more attributes of the parameters in the set of qubit parameters, including dependencies of qubit parameters on one or more other qubit parameters in the set of qubit parameters, wherein the parameters and their dependencies on one another may be represented by a directed graph including a node for each parameter and a directed edge for each dependency. The qubit calibration system 130 may optionally store the data describing the one or more attributes of the parameters in the set of qubit parameters in a data store, e.g., qubit parameter and attributes data store 132. In some implementations the qubit calibration system 130 may obtain some or all of the data describing the one or more attributes of the parameters in the set of qubit parameters from a third party external to the automatic qubit calibration system (e.g., through user input).

The qubit calibration system 130 may use the data describing the one or more attributes of the parameters in the set of qubit parameters to automatically calibrate the qubit parameters. For example, the qubit calibration system 130 may be configured to identify a qubit parameter (e.g., a qubit parameter that corresponds to a root node of the directed graph), select a set of qubit parameters that includes the identified qubit parameter and one or more dependent qubit parameters (e.g., the qubit parameter that corresponds to the selected node and the qubit parameters of each descendant node). The set of qubit parameters may be ordered according to a node ancestry ordering. The qubit calibration system 130 may calibrate the parameters in the set of qubit parameters in sequence according to the ordering. A process used by the qubit calibration system 130 to perform these operations is described in more detail below with reference to FIG. 3.

The qubit calibration system 130 may be configured to perform calibration experiments on qubit parameters in order to calibrate the qubit parameters of the one or more qubits 115 included in the quantum computing system 100. A calibration experiment may include implementing, for instance, single, static set of waveforms, where a single experiment may be repeated N times to gather statistics on a probability distribution of a final qubit state after the experiment. For example, a calibration experiment may include performing a pi pulse followed by a readout pulse.

A calibration experiment may also include an ensemble of experiments where waveforms are altered from experiment to experiment. An example ensemble of experiments includes a Rabi scan, e.g., a series of experiments consisting of a rotation pulse followed by a readout pulse, where each experiment would have a different amplitude for the rotation pulse. Such an ensemble of experiments could be used to determine a relationship between rotation amplitude and qubit state.

The results of the calibration experiment(s) can be expressed as calibration data. The calibration data can take any suitable form or format. In some embodiments, the calibration data is represented in multiple dimensions, such as a two dimensional image. Other suitable representations of the data can be used without deviating from the scope of the present disclosure. For instance, array(s), matrix(s), tensor(s), and/or other representations of any dimension can be used. The calibration data can be based on many different variables (e.g., two variables, three variables, four variables, or more).

A calibration test can be performed using a discriminator operation to determine if the calibration data meets specification(s). A qubit parameter passes the calibration test when the qubit parameters meets specification(s). A qubit parameter fails or does not pass the calibration test when the qubit parameter does not meet specification(s).

Figure 3:
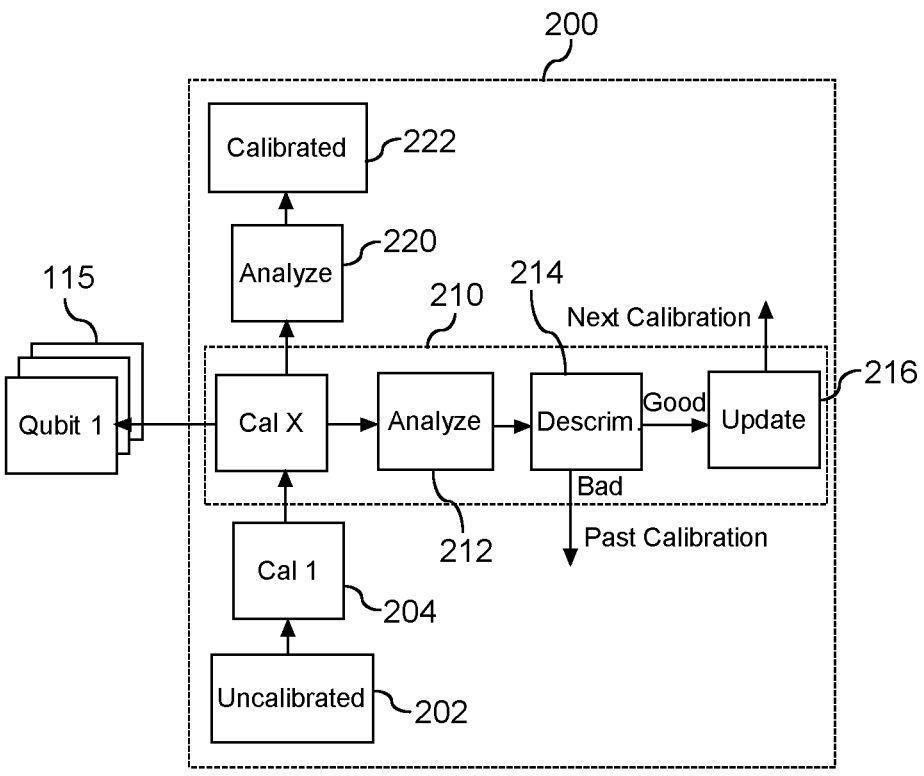
FIG. 3 depicts an example qubit calibration workflow according to example embodiments of the present disclosure.

FIG. 3 depicts an example calibration process 200 for calibrating qubit parameters for a qubit 115 in a quantum computing system according to example aspects of the present disclosure. As shown, for each qubit 115, the calibration process 200 can start from a root node where no qubit parameters have been learned and the qubit 115 is in uncalibrated state 202. The process 200 proceeds through calibration of qubit parameters (e.g., by traversing a directed graph representation of the qubit parameters). In FIG. 3, item 204 is representative of a qubit parameter Cal 1 (e.g., a node in the directed graph) having completed the calibration process. In some embodiments, the process 200 can proceed through each qubit parameter by traversing the directed graph according to a node ancestry ordering until all qubit parameters have been calibrated. The process 200 can determine at 220 whether all qubit parameters meet required specification(s). If so, the process 200 can determine that the qubit 115 is in a calibrated state 222.

An example workflow for the calibration of each qubit parameter "Cal X" is expanded and shown at 210 of FIG. 3. For each qubit parameter, the process 200 obtains calibration data for the qubit parameter. Calibration data can be obtained by performing calibration experiments. The calibration data can take any suitable form or format. In some embodiments, the calibration data is represented in multiple dimensions, such as a two dimensional image.

At 212 a calibration data is analyzed. In some embodiments, the calibration data can be analyzed using one or more process operations. The process operations can include, for instance, pre-processing of the calibration data, fitting of the calibration data, optimization of the calibration data, and/or other process operations to analyze the calibration data.

The process 210 implements a discriminator operation 214 to determine whether the calibration data for the qubit parameter passes a calibration test (e.g., meets one or more specifications) or does not pass the calibration test (e.g., does not meet one or more specifications). If the calibration data passes the calibration test (e.g., the qubit parameter is good), the process 210 determines a value of the calibration parameter at 216 (e.g., sets or updates the value to a value associated with the calibration data) and proceeds to the next qubit parameter (e.g., by traversing the directed graph). If the calibration data does not pass the calibration test (e.g., the qubit parameter is bad), the process 200 can return to a past calibration of a previous qubit parameter (e.g., by moving towards the root node in the directed graph).

For the calibration of any qubit parameter, the calibration data may be corrupted. Examples of corruption include random noise in the calibration data or masking noise (e.g., missing data). Random noise can be common at early stages in a calibration procedure when qubit parameters (e.g., readout parameters) are not yet precisely known. Masking noise can occur, for instance, when software and/or hardware glitches occur during calibration experiments.

Figure 4:
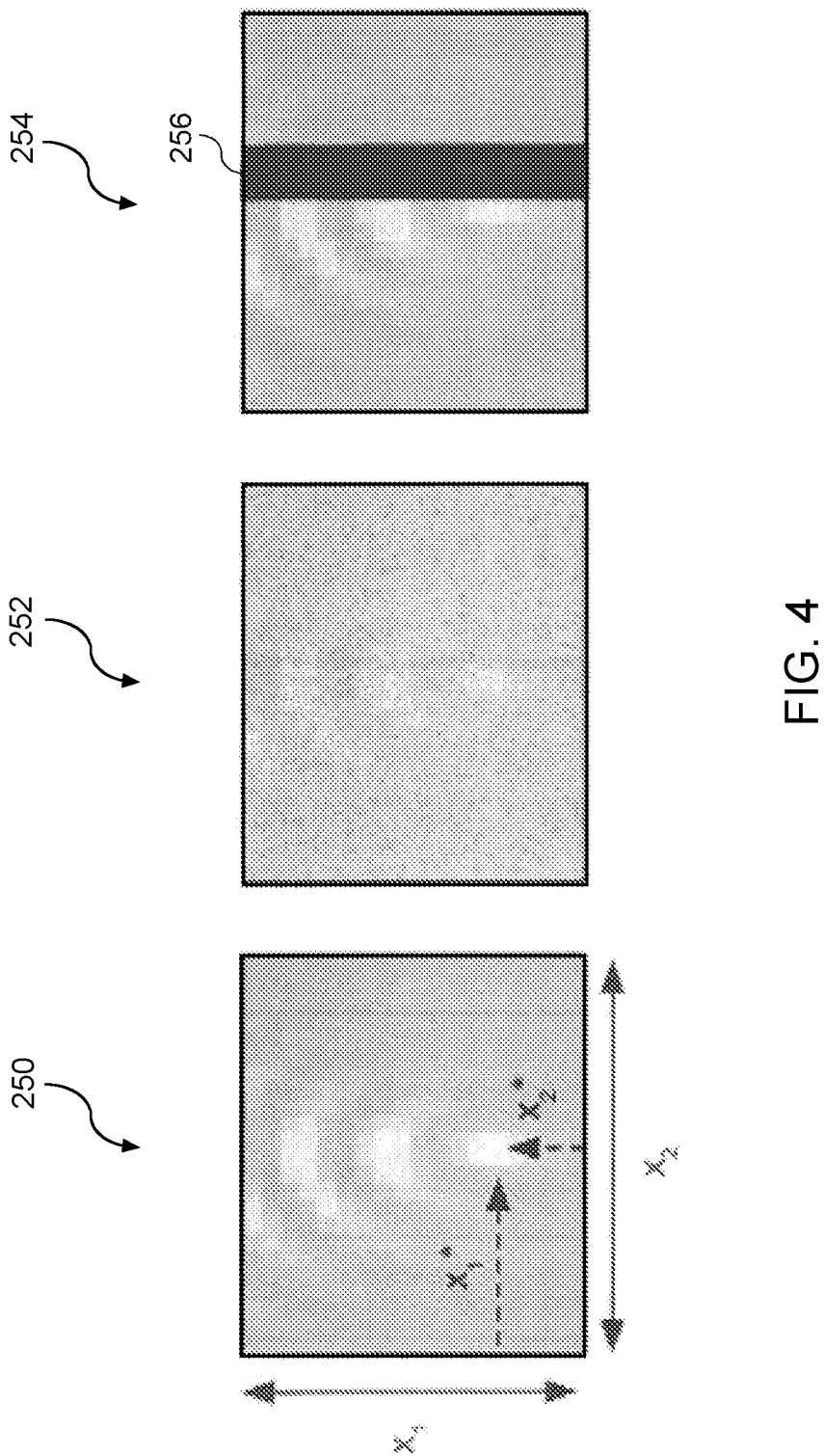
FIG. 4 depicts example calibration data according to example embodiments of the present disclosure.

FIG. 4 depicts one example representation of calibration data. More specifically, FIG. 4 illustrates calibration data 250 that represents a good dataset (e.g., not corrupted). The calibration data 250 of FIG. 4 is multidimensional calibration data and is represented as a two-dimensional image. Each pixel in the image can be representative of a measured value based on variables $X_1$ and $X_2$. For instance, $X_1$ can represent a microwave voltage amplitude and $X_2$ can represent a DC voltage amplitude. Pixel intensity and/or value can be a value between 0 and 1 that represents the qubit state.

FIG. 4 depicts corrupted calibration data 252 having random noise. The random noise is throughout the corrupted calibration data 252. Also shown in FIG. 4 is corrupted calibration data 254 having masking noise. More particularly, corrupted calibration data 254 has portion 256 with missing calibration data.

Corrupted calibration data can reduce the reliability and/or speed of the calibration process for a qubit in a quantum computing system. According to example aspects of the present disclosure, corrupted calibration data can be reconstructed during the calibration process using one or more de-corrupting autoencoders.

FIG. 4 depicts one example representation of calibration data (e.g., as a two-dimensional image) for purposes of illustration and discussion. Those of ordinary skill in the art, using the disclosures provided herein, will understand that other representations of the calibration data can be used without deviating from the scope of the present disclosure. For instance, de-corrupting autoencoders 300 can be used according to example aspects of the present disclosure to process calibration data in any suitable form, format, or representation. For instance, the calibration data can be one-dimensional, two-dimensional, three-dimensional, or any dimensional tensor(s).

Figure 5:
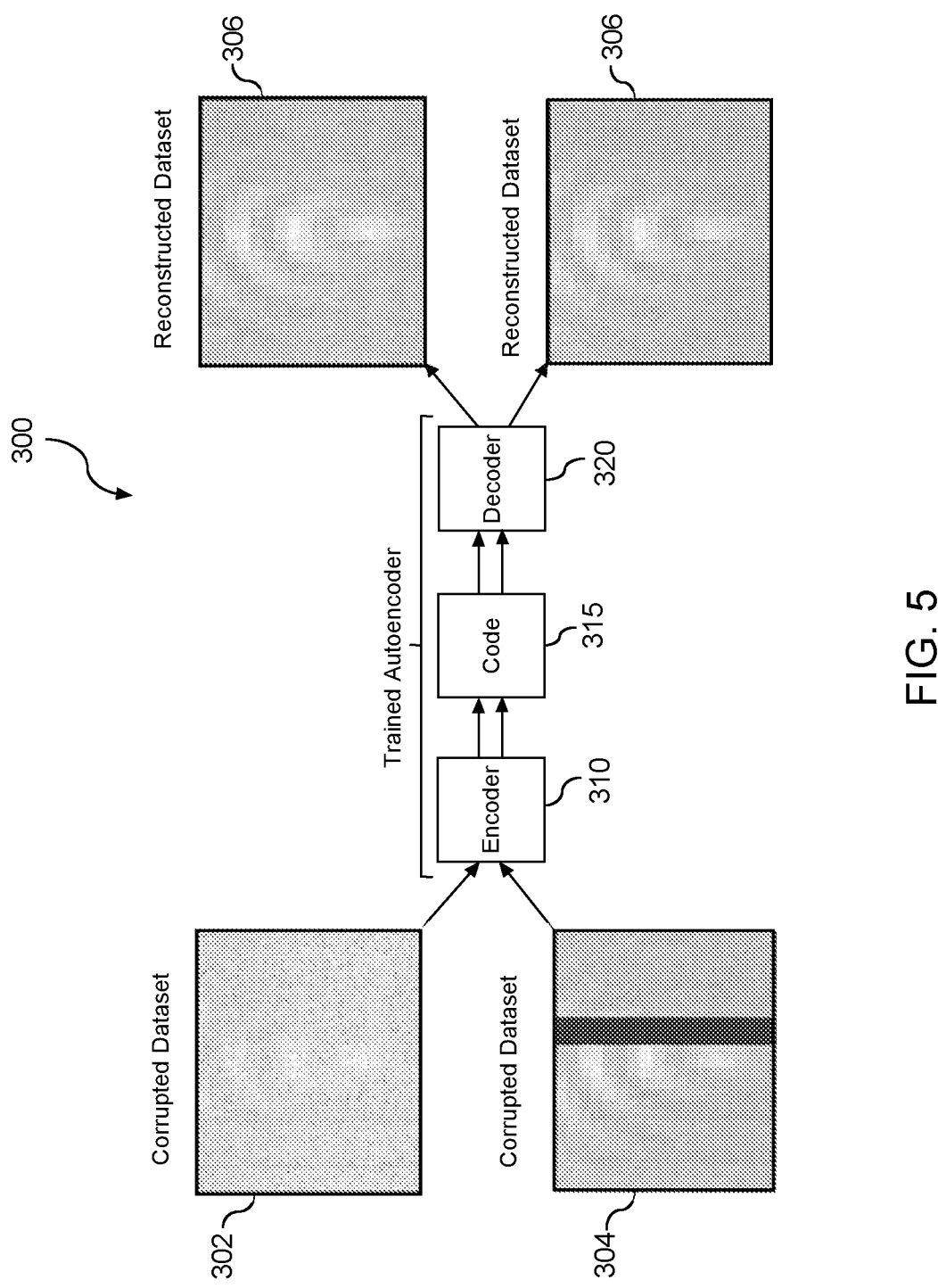
FIG. 5 depicts an example de-corrupting autoencoder according to example embodiments of the present disclosure.

FIG. 5 depicts an example de-corrupting autoencoder 300 according to example embodiments of the present disclosure. The autoencoder 300 can be a deep neural network architecture that can learn latent features within an unsupervised learning framework. The autoencoder 300 includes an encoder model 310 and a decoder model 320. The encoder model 310 is configured to code a dataset (e.g., calibration data) into a latent representation or code 315. The decoder model 320 is configured to reconstruct the dataset (e.g., reconstructed calibration data) from the latent representation or code 315.

The encoder model 310 and/or the decoder model 320 can be implemented as neural networks. For example, the encoder model 310 and/or the decoder model 320 can be implemented as feed-forward neural networks with fully connected layers. The encoder model 310 and the decoder model 320 can be trained simultaneously using backpropagation. In some implementations, the encoder model 310 can down-convert input data (e.g., calibration data) into a latent representation that is of lower dimension relative to the input data. The decoder model 320 can upconvert the latent representation into a reconstruction of the input data. By bottlenecking the latent space dimension, the autoencoder 300, in some implementations, can capture essential details of the input data, which can be applied for data de-corruption.

For instance, as shown in FIG. 5, the autoencoder 300 can receive as input data corrupted datasets 302 (e.g., with random noise) and/or and corrupted datasets 304 (e.g., with masking noise). The encoder model 310 can encode the input data into code 315. The decoder model 320 can generate reconstructed dataset(s) 306 from the code 315. The reconstructed dataset(s) 306 can be a reconstruction of input data without data corruption (e.g., with reduced noise). In this way, the autoencoder 300 can be used to remove or reduce noise from calibration data during a qubit calibration process.

Figure 6:
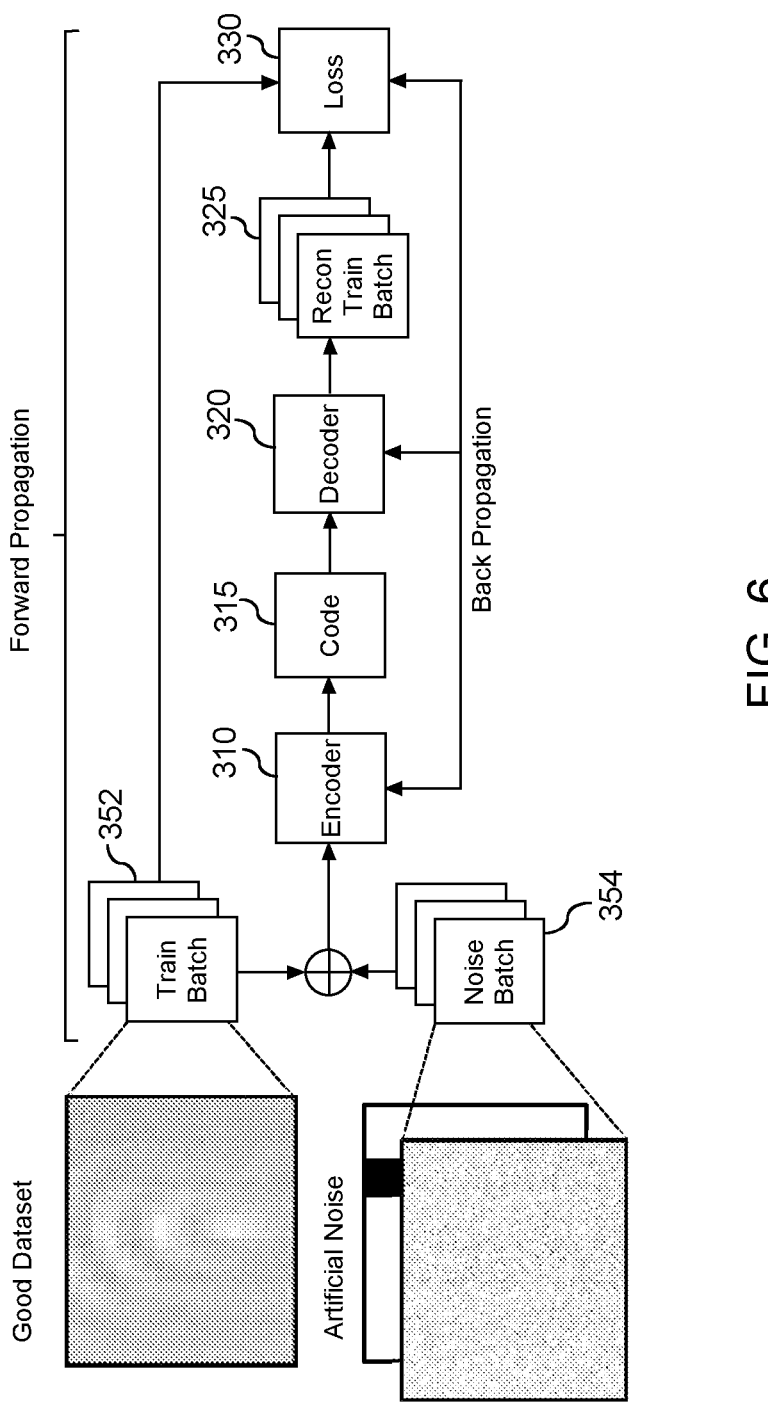
FIG. 6 depicts example training of a de-corrupting autoencoder according example aspects of the present disclosure.

FIG. 6 depicts the example training of the autoencoder 300 for data de-corruption according to example embodiments of the present disclosure. As shown, the autoencoder 300 can be trained using dataset 352. Dataset 352 can initially include only good data (without noise). During training, the dataset 352 can be artificially corrupted via an arbitrary mathematical operation. In some embodiments, images in the dataset can be corrupted with respective fake noise samples from the "Noise Batch" (354). The "Noise Batch" can include no noise (e.g. good data goes through), random noise, masking noise, arbitrary other noise. In some implementations, a Gaussian noise overlay can be applied to an uncorrupted training image to generate a corrupted training image. Similarly, a random masking effect (e.g., a segmented overlay) can be applied over a portion of an uncorrupted training image to generate a corrupted training image. In some embodiments, the type of noise or corruption applied to images in the training dataset 352 can represent the type(s) of noise seen in real calibration data.

During training, the autoencoder 300 generates a reconstructed training batch(s) 325 using the encoder model 310 and the decoder model 320. A loss 330 is computed based on the reconstructed training batch(s) 325. The loss 330 penalizes the encoder model 310 and/or the decoder model 320 for not reconstructing a good dataset 352. For example, the loss 330 can be determined based on a comparison between a reconstructed image in the reconstructed training batch 325 and a groundtruth version of the reconstructed image (e.g., a corresponding uncorrupted training image from the good dataset 352).

An example training workflow for training the autoencoder 300 according to example embodiments of the present disclosure is provided below. An arbitrary encoder model 310 is established $E(X,\phi)=Z$. X is the dataset that is encoded into a latent representation or code 315. Z is the latent representation of X. $\phi$ is the network parameterization, which can be arbitrary. An arbitrary decoder model 320 is established $D(Z,\theta)=X'$. Z is the latent representation or code 315 that is decoded into the reconstructed dataset. X' is the reconstructed dataset. $\theta$ is the network parameterization, which can be arbitrary. A regularization function on network parameters may be established as $\Lambda(\phi, \theta)$. $\phi$ and $\theta$ can be randomly initialized. For Epoch in Total Epochs: (a) Select Train Batch {X}, where the brackets indicate multiple training datasets; (b) Compute a Corrupted Train Batch $\{X_C\}=f_C(\{X\})$; (c) Compute the Latent Batch $\{Z\}=E(\{X_C\}; \phi)$; (d) Compute the Reconstructed Train Batch $\{X'\}=D(\{Z\}; \theta)=D(E(\{X_C\}; \phi); \theta)$; (e) Compute Reconstruction Loss $L(\phi, \theta, \{X\}, \{X_C\})=\Sigma_{batch}|\{X\}-D(E(\{X_C\}; \phi); \theta)|^2+\Lambda(\phi, \theta)$; (f) Compute Loss Gradients $\nabla_{\phi, \theta} L$ and update $\phi$, $\theta$ via backpropagation. Use optimal parameters $\phi$ *, $\theta$* to build de-corrupting autoencoder $N(X)=D(E(X; \phi *); \theta*)$.

Figure 7:
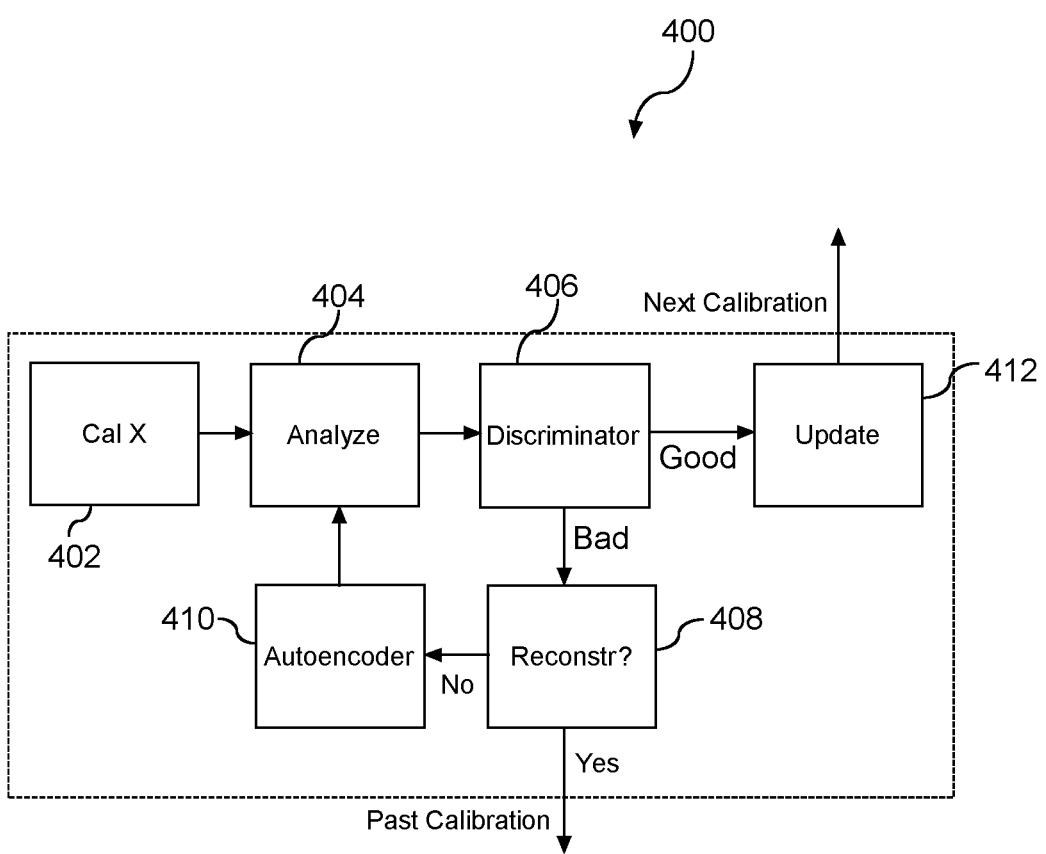
FIG. 7 depicts an example calibration process for a qubit parameter according to example embodiments of the present disclosure.

FIG. 7 depicts implementation of an autoencoder in a qubit calibration process 400 according to example embodiments of the present disclosure. More particularly, calibration data can be obtained at 402 for a qubit parameter "Cal X" for a qubit in a quantum computing system. The calibration data can be obtained by performing a calibration experiment. The calibration data can take any suitable form or format. In some embodiments, the calibration data is represented in multiple dimensions, such as a two dimensional image.

At 404 the calibration data can be analyzed using one or more process operations. The process operations can include, for instance, pre-processing of the calibration data, fitting of the calibration data, optimization of the calibration data, and/or other process operations to analyze the calibration data.

The process 400 implements a discriminator operation 406 to determine whether the calibration data for the qubit parameter passes a calibration test (e.g., meets one or more specifications) or does not pass the calibration test (e.g., does not meet one or more specifications). If the calibration data passes the calibration test (e.g., the qubit parameter is good), the process 400 determines a value of the calibration parameter at 412 (e.g., updates or sets the value to the value associated with the calibration data) and proceeds to calibrate the next qubit parameter (e.g., by traversing the directed graph).

If the calibration data does not pass the calibration test (e.g., the qubit parameter is bad), the process 400 can determine at 408 whether the calibration data has previously been reconstructed. If so, the process 400 can return to a past calibration of a previous qubit parameter (e.g., by moving towards the root node in the directed graph). If the calibration data has not previously been reconstructed, the process 400 can provide the calibration data to the de-corrupting autoencoder 410 according to example aspects of the present disclosure to generate reconstructed calibration data. The reconstructed calibration data can then be subjected to the analysis 404 and a discriminator operation 406 as shown in FIG. 7.

Figure 8:
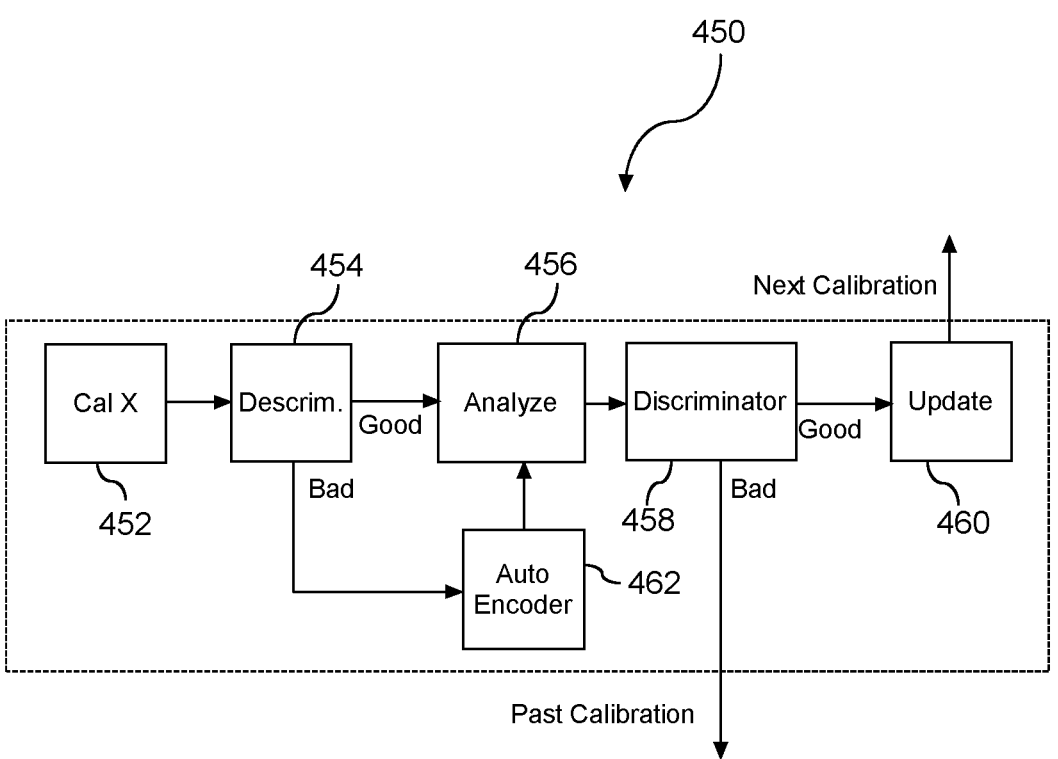
FIG. 8 depicts an example calibration process for a qubit parameter according to example embodiments of the present disclosure.

FIG. 8 depicts implementation of an autoencoder in qubit calibration process 450 according to example embodiments of the present disclosure. More particularly, calibration data can be obtained at 452 for a qubit parameter "Cal X" for a qubit in a quantum computing system. The calibration data can be obtained by performing a calibration experiment. The calibration data can take any suitable form or format. In some embodiments, the calibration data is represented in multiple dimensions, such as a two dimensional image.

At 454, the process 450 can determine whether the calibration data is corrupted. For instance, the calibration data can be analyzed using a signal-to-noise based classifier to determine a signal to noise ratio based metric for the calibration data. The process 450 can determine whether the calibration data is corrupted based on the signal to noise ratio based metric. In addition and/or in the alternative, a classifier model (e.g., a machine learned classifier model) can determine whether the calibration data is corrupted. The model can be trained, for instance, using known good calibration data and known corrupted calibration data. The model can be configured to classify the calibration data as corrupted or not corrupted.

As shown in FIG. 8, in response to determining the calibration data is corrupted, the calibration data can be reconstructed using a de-corrupting autoencoder 462 according to example aspects of the present disclosure. At 454 the reconstructed calibration data can be analyzed using one or more process operations. The process operations can include, for instance, pre-processing of the calibration data, fitting of the calibration data, optimization of the calibration data, and/or other process operations to analyze the calibration data.

The process 450 can implement a discriminator operation 456 to determine whether the calibration data for the qubit parameter passes a calibration test (e.g., meets one or more specifications) or does not pass the calibration test (e.g., does not meet one or more specifications). If the calibration data passes the calibration test (e.g., the qubit parameter is good), the process 450 determines a value of the calibration parameter at 460 (e.g., updates or sets the value to the value associated with the calibration data) and proceeds to calibrate the next qubit parameter (e.g., by traversing the directed graph).

Figure 9:
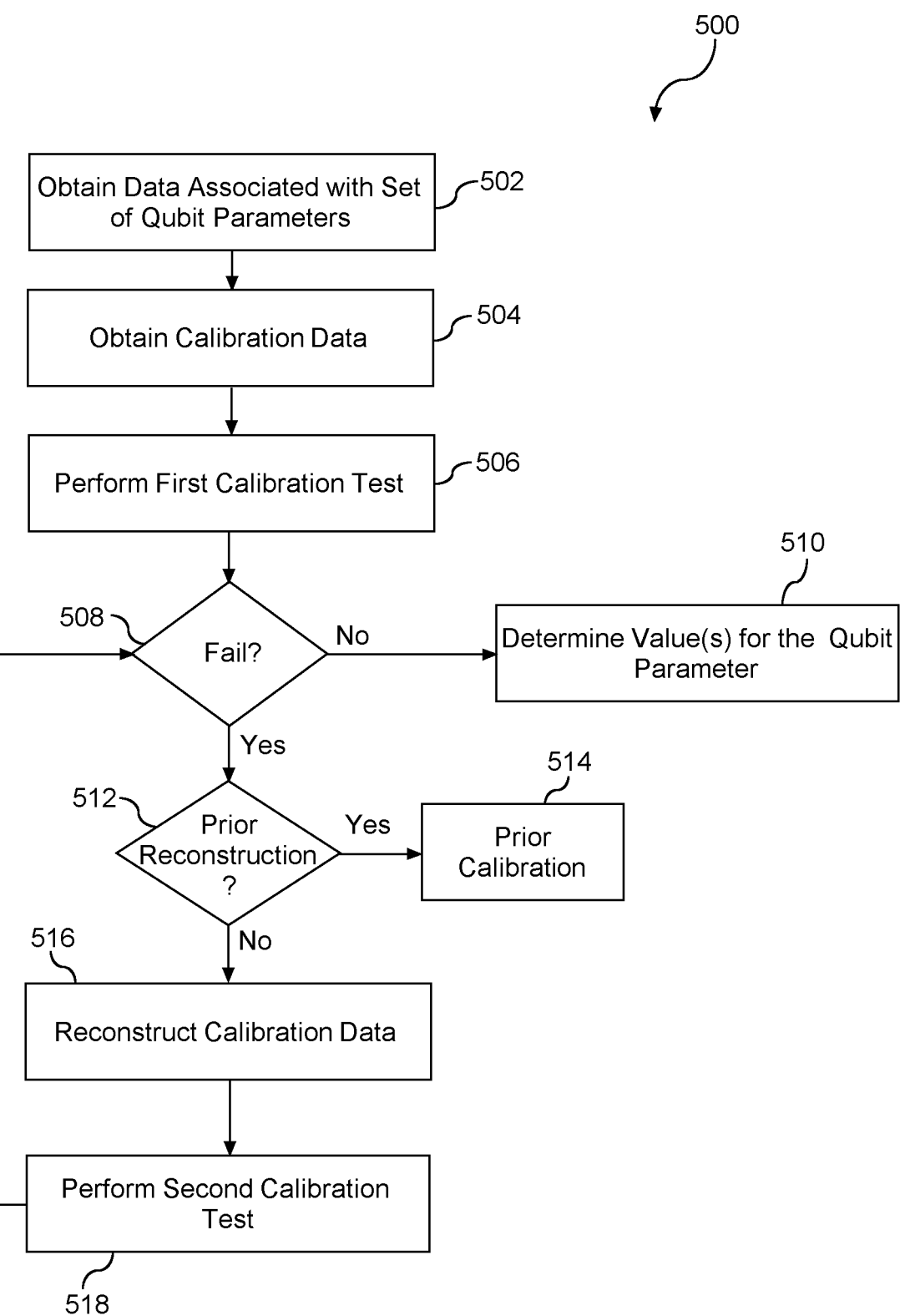
FIG. 9 depicts a flow diagram of an example method according to example embodiments of the present disclosure.

FIG. 9 depicts a flow diagram of an example method 500 according to example embodiments of the present disclosure. The method 500 can be implemented using any suitable quantum computing system, such as the quantum computing system depicted in FIGS. 1 and 2. FIG. 9 depicts steps performed in a particular order for purposes of illustration and discussion. Those of ordinary skill in the art, using the disclosures provided herein, will understand that various steps of any of the methods disclosed herein can be adapted, modified, performed simultaneously, omitted, include steps not illustrated, rearranged, and/or expanded in various ways without deviating from the scope of the present disclosure.

At 502, the method can include obtaining data associated with a set of qubit parameters. As used herein, obtaining data can include receiving, accessing from, for instance, one or more memory devices, determining, calculating or generating data. The data associated with the set of qubit parameters can include the identity of qubit parameters, initial values, and/or dependencies among qubit parameters. In some embodiments, the data associated with a set of qubit parameters can be represented by a directed graph. The directed graph can have a node for each qubit parameter in the set of qubit parameters and a directed edge for each dependency between qubit parameters in the set of qubit parameters.

At 504, the method can include obtaining calibration data for a qubit parameter. The calibration data can be obtained by performing a calibration experiment. The calibration data can be represented in multiple dimensions. For instance, the calibration data can be represented as a two-dimensional image.

At 506, the method can include analyzing the calibration data and performing a first calibration test on the calibration data. In some embodiments, the first calibration test can compare the calibration data with certain specification(s), thresholds, requirements, etc. The calibration test can be implemented using a discriminator operation that determines whether the calibration data meets certain specification(s).

As shown at 508, the method proceeds to 510 or to 512 depending on whether the calibration data passes or fails the first calibration test. In response to determining the calibration data passes or does not fail the first calibration test, the method can determine value(s) for the qubit parameter (e.g., set or update the value based on the calibration data) as shown at 510. In response to determining the calibration data does not pass or fails the first calibration test, the method can determine at 512 whether the calibration data has previously been reconstructed using an autoencoder (e.g., based on metadata flagging whether prior reconstruction has occurred). If so, the method can proceed to a prior calibration of a previous qubit parameter (e.g., by moving towards the root node in the directed graph) at 514.

In response to determining that the calibration data has not been previously reconstructed, the method can proceed to 516 to reconstruct the calibration data using a de-corrupting autoencoder according to example embodiments of the present disclosure. The method can then perform a second calibration test on the calibration data at 518. In some embodiments, the second calibration test can compare the calibration data with certain specification(s), thresholds, requirements, etc. The second calibration test can be implemented using a discriminator operation that determines whether the calibration data meets certain specification(s). In some embodiments, the second calibration test can simply repeat the first calibration test. After the second calibration test, the method returns to 508 and proceeds to 510 or to 512 depending on the whether the calibration data passes or fails the second calibration test as discussed above.

Figure 10:
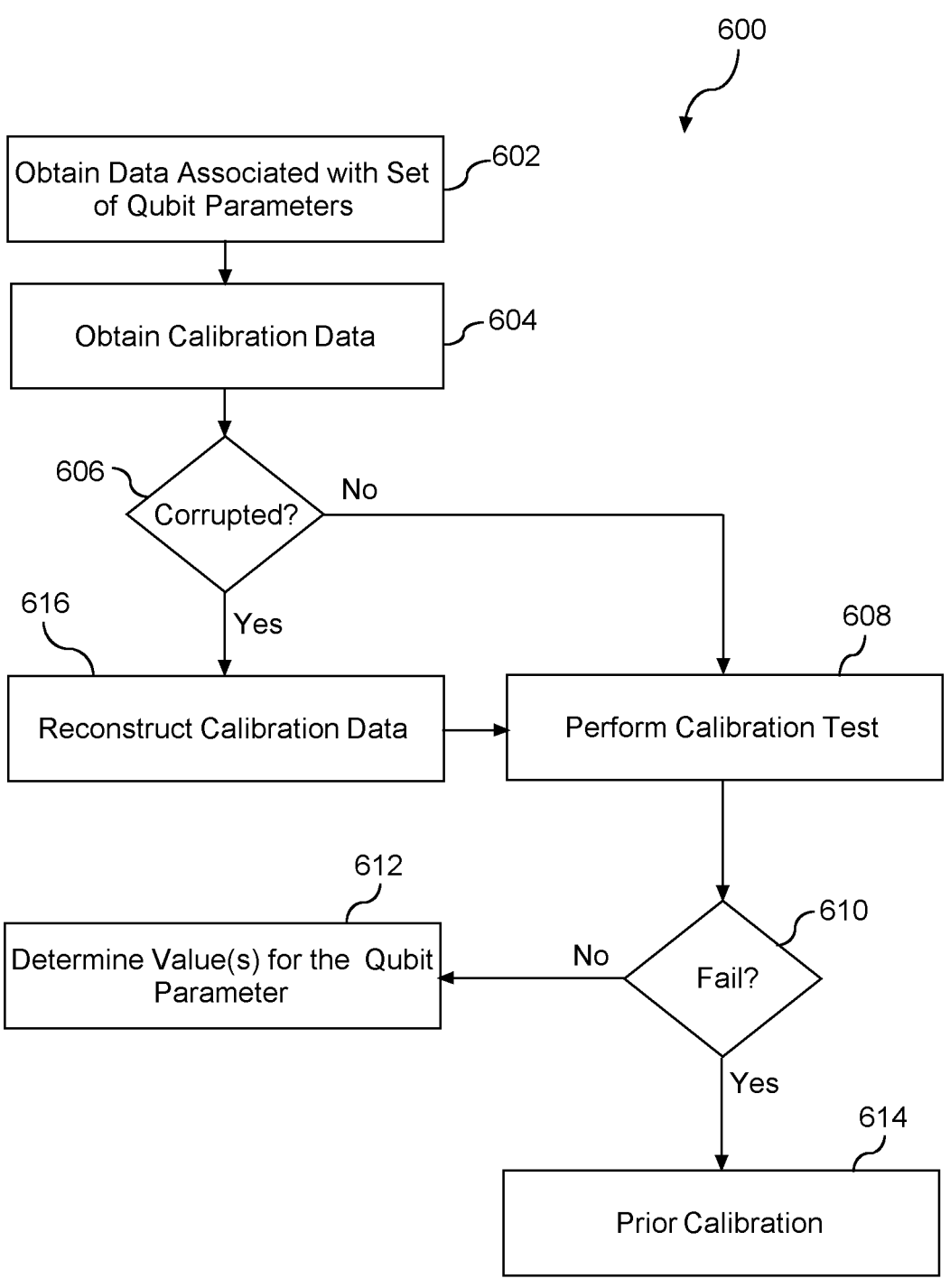
FIG. 10 depicts a flow diagram of an example method according to example embodiments of the present disclosure.

FIG. 10 depicts a flow diagram of an example method 600 according to example embodiments of the present disclosure. The method 600 can be implemented using any suitable quantum computing system, such as the quantum computing system depicted in FIGS. 1 and 2. FIG. 10 depicts steps performed in a particular order for purposes of illustration and discussion. Those of ordinary skill in the art, using the disclosures provided herein, will understand that various steps of any of the methods disclosed herein can be adapted, modified, performed simultaneously, omitted, include steps not illustrated, rearranged, and/or expanded in various ways without deviating from the scope of the present disclosure.

At 602, the method can include obtaining data associated with a set of qubit parameters. The data associated with the set of qubit parameters can include the identity of qubit parameters, initial values, and/or dependencies among qubit parameters. In some embodiments, the data associated with a set of qubit parameters can be represented by a directed graph. The directed graph can have a node for each qubit parameter in the set of qubit parameters and a directed edge for each dependency between qubit parameters in the set of qubit parameters.

At 604, the method can include obtaining calibration data for a qubit parameter. The calibration data can be obtained by performing a calibration experiment. The calibration data can be represented in multiple dimensions. For instance, the calibration data can be represented as a two-dimensional image.

At 606, the method can include determining whether the calibration data is corrupted. In some embodiments, calibration data is corrupted when it includes a threshold amount of noise. The threshold can be defined based on application requirements. In some embodiments, the calibration data can be analyzed using a signal-to-noise based classifier to determine a signal to noise ratio based metric for the calibration data. The process 450 can determine whether the calibration data is corrupted based on the signal to noise ratio based metric. In addition and/or in the alternative a classifier model (e.g., a machine learned classifier model) can determine whether the calibration data is corrupted. The model can be trained, for instance, using known good calibration data and known corrupted calibration data. The model can be configured to classify the calibration data as corrupted or not corrupted.

When the calibration data is corrupted, the method can include at 616 reconstructing the calibration data using a de-corrupting autoencoder according to example embodiments of the present disclosure. The method can then proceed to performing the calibration test at 608. When the calibration data is not corrupted, the method can proceed to the calibration test at 608 without reconstructing the calibration data using a de-corrupting autoencoder.

At 608, the method can include analyzing the calibration data and performing a calibration test on the calibration data. In some embodiments, the calibration test can compare the calibration data with certain specification(s), thresholds, requirements, etc. The calibration test can be implemented using a discriminator operation that determines whether the calibration data meets certain specification(s)

As shown at 610, the method proceeds to 612 or to 614 depending on whether the calibration data passes or fails the first calibration test. In response to determining the calibration data passes or does not fail the first calibration test, the method can determine value(s) for the qubit parameter (e.g., set or update the value based on the calibration data) as shown at 612. Otherwise, the method can proceed to a prior calibration of a previous qubit parameter (e.g., by moving towards the root node in the directed graph) at 614. Once qubit parameters have been determined at 612, the quantum computing system may be operated in accordance with the determined qubit parameters to implement a quantum computing circuit.

Figure 11:
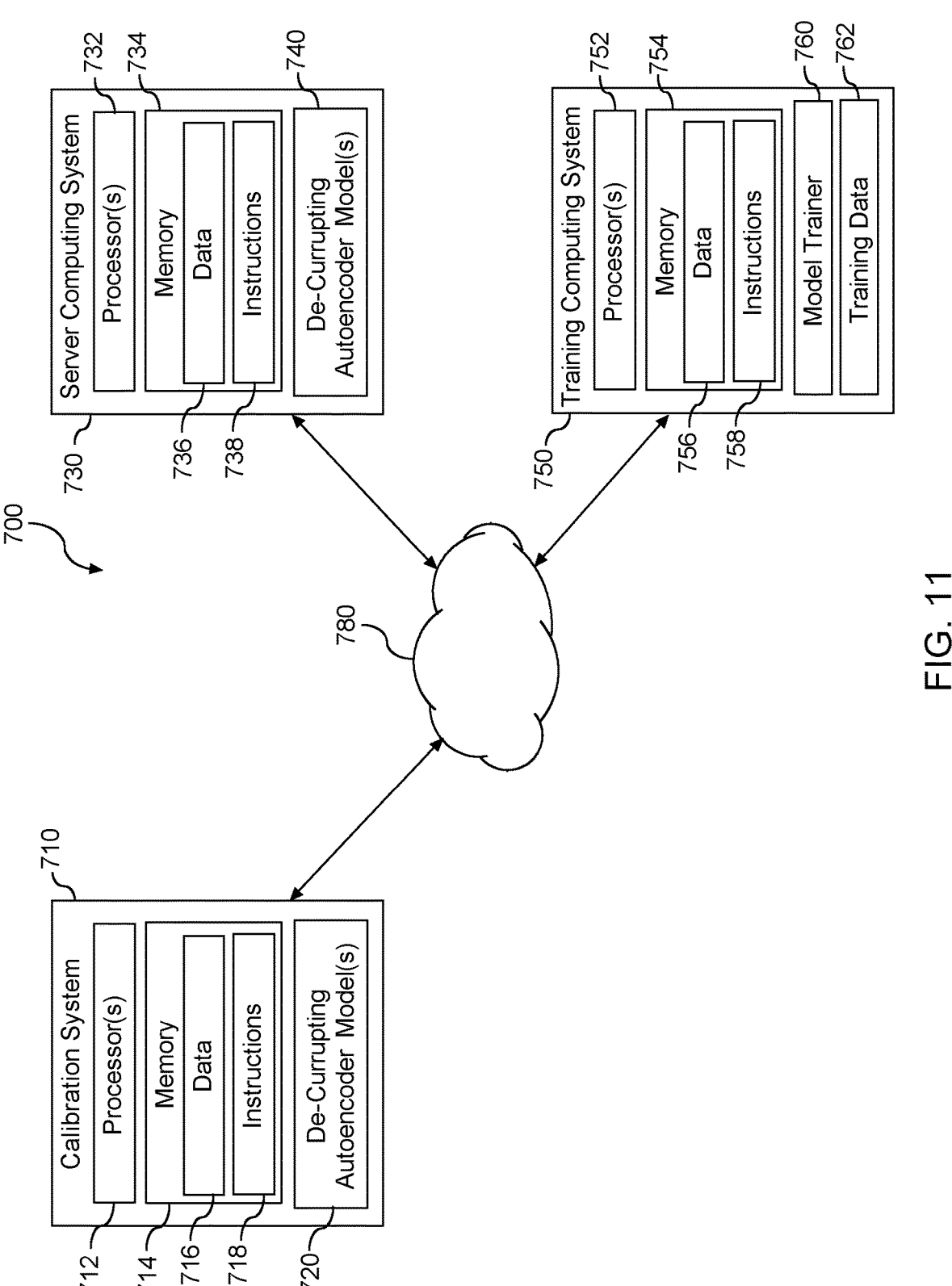
FIG. 11 depicts an example computing environment according to example embodiments of the present disclosure.

FIG. 11 depicts a block diagram of an example computing system 700 that can be used to implement a de-corrupting autoencoder for qubit calibration according to example embodiments of the present disclosure. The system 700 includes a calibration system 710, a server computing system 730, and a training computing system 750 that are communicatively coupled over a network 780.

The calibration system 710 can include any type of computing device (e.g., classical and/or quantum computing device). The calibration system 710 includes one or more processors 712 and a memory 714. The one or more processors 712 can be any suitable processing device (e.g., a processor core, a microprocessor, an ASIC, a FPGA, a controller, a microcontroller, etc.) and can be one processor or a plurality of processors that are operatively connected. The memory 714 can include one or more non-transitory computer-readable storage mediums, such as RAM, ROM, EEPROM, EPROM, flash memory devices, magnetic disks, etc., and combinations thereof. The memory 714 can store data 716 (e.g., qubit parameters) and instructions 718 which are executed by the processor 712 to cause the calibration system 710 to perform operations.

In some implementations, the calibration system 710 can store or include one or more de-corrupting autoencoders 720. For example, the de-corrupting autoencoders 720 (e.g., including an encoder model and a decoder model) can be or can otherwise include various machine-learned models such as neural networks (e.g., deep neural networks) or other types of machine-learned models, including non-linear models and/or linear models. Neural networks can include feedforward neural networks, recurrent neural networks (e.g., long short-term memory recurrent neural networks), convolutional neural networks or other forms of neural networks. An example de-corrupting autoencoder is discussed with reference to FIG. 5.

In some implementations, the one or more de-corrupting autoencoders can be received from the server computing system 730 over network 780, stored in the memory 714, and then used or otherwise implemented by the one or more processors 712. In some implementations, the calibration system 710 can implement multiple parallel instances of a single autoencoder 720 (e.g., to perform parallel calibration data reconstruction across multiple instances of calibration data).

More particularly, the de-corrupting autoencoders 720 can reconstruct calibration data obtained during a calibration test process for a qubit parameter according to example aspects of the present disclosure. The de-corrupting autoencoders 720 can reduce noise in the calibration data, improving the reliability and/or speed of the qubit calibration process.

Additionally, or in the alternative, one or more de-corrupting autoencoders 740 can be included in or otherwise stored and implemented by the server computing system 730 that communicates with the calibration system 710 according to a client-server relationship. For example, the de-corrupting autoencoders 740 can be implemented by the server computing system 730. Thus, one or more autoencoders 720 can be stored and implemented at calibration system 710 and/or one or more autoencoders 740 can be stored and implemented at the server computing system 730.

The calibration system 710 can also include one or more user input components that receives user input. For example, the user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 730 includes one or more processors 732 and a memory 734. The one or more processors 732 can be any suitable processing device (e.g., a processor core, a microprocessor, an ASIC, a FPGA, a controller, a microcontroller, etc.) and can be one processor or a plurality of processors that are operatively connected. The memory 734 can include one or more non-transitory computer-readable storage mediums, such as RAM, ROM, EEPROM, EPROM, flash memory devices, magnetic disks, etc., and combinations thereof. The memory 734 can store data 736 and instructions 738 which are executed by the processor 732 to cause the server computing system 730 to perform operations.

In some implementations, the server computing system 730 includes or is otherwise implemented by one or more server computing devices. In instances in which the server computing system 730 includes plural server computing devices, such server computing devices can operate according to sequential computing architectures, parallel computing architectures, or some combination thereof.

As described above, the server computing system 730 can store or otherwise include one or more machine-learned de-corrupting autoencoders 740. For example, the autoencoders 740 can be or can otherwise include various machine-learned models. Example machine-learned models include neural networks or other multi-layer non-linear models. Example neural networks include feed forward neural networks, deep neural networks, recurrent neural networks, and convolutional neural networks. An example autoencoder 740 is discussed with reference to FIG. 5.

The user computing device 702 and/or the server computing system 730 can train the autoencoders 720 and/or 740 via interaction with the training computing system 750 that is communicatively coupled over the network 780. The training computing system 750 can be separate from the server computing system 730 or can be a portion of the server computing system 730.

The training computing system 750 includes one or more processors 752 and a memory 754. The one or more processors 752 can be any suitable processing device (e.g., a processor core, a microprocessor, an ASIC, a FPGA, a controller, a microcontroller, etc.) and can be one processor or a plurality of processors that are operatively connected. The memory 754 can include one or more non-transitory computer-readable storage mediums, such as RAM, ROM, EEPROM, EPROM, flash memory devices, magnetic disks, etc., and combinations thereof. The memory 754 can store data 756 and instructions 758 which are executed by the processor 752 to cause the training computing system 750 to perform operations. In some implementations, the training computing system 750 includes or is otherwise implemented by one or more server computing devices.

The training computing system 750 can include a model trainer 760 that trains the machine-learned autoencoders 720 and/or 740 using various training or learning techniques, such as, for example, backwards propagation of errors. In some implementations, performing backwards propagation of errors can include performing truncated backpropagation through time. The model trainer 760 can perform a number of generalization techniques (e.g., weight decays, dropouts, etc.) to improve the generalization capability of the models being trained.

In particular, the model trainer 760 can train the autoencoders 720 and/or 740 based on a set of training data 762. The training data 762 can include, for example, images that are not corrupted and a corrupted training dataset (e.g., images with random noise or masking noise).

The model trainer 760 includes computer logic utilized to provide desired functionality. The model trainer 760 can be implemented in hardware, firmware, and/or software controlling a general purpose processor. For example, in some implementations, the model trainer 760 includes program files stored on a storage device, loaded into a memory and executed by one or more processors. In other implementations, the model trainer 760 includes one or more sets of computer-executable instructions that are stored in a tangible computer-readable storage medium such as RAM hard disk or optical or magnetic media.

The network 780 can be any type of communications network, such as a local area network (e.g., intranet), wide area network (e.g., Internet), or some combination thereof and can include any number of wired or wireless links. In general, communication over the network 780 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 11 illustrates one example computing system that can be used to implement example aspects of the present disclosure. Other computing systems can be used as well. For example, in some implementations, the calibration system 710 can include the model trainer 760 and the training dataset 762. In such implementations, the autoencoders 720 can be both trained and used locally at the calibration system 710.

Implementations of the digital and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for calibrating a qubit in operating a quantum computing system, the method comprising:

obtaining, by one or more computing devices, data associated with a set of one or more qubit parameters for a qubit included in quantum computing system, wherein obtaining the data associated with a set of one or more qubit parameters comprises calibrating the qubit using a quantum circuit;

obtaining, by the one or more computing devices, calibration data associated with at least one qubit parameter in the set of one or more qubit parameters, wherein obtaining the calibration data includes at least measuring a value associated with the qubit;

performing, by the one or more computing devices, a first calibration test on the calibration data;

determining, by the one or more computing devices, the calibration data fails the first calibration test;

in response to determining, by the one or more computing devices, the calibration data fails the first calibration test, processing, by the one or more computing devices, the calibration data using the de-corrupting autoencoder to generate reconstructed calibration data;

performing, by the one or more computing devices, a second calibration test on the reconstructed calibration data;

determining, by the one or more computing devices, the value for the at least one qubit parameter based at least in part on the reconstructed calibration data when the reconstructed calibration data passes the second calibration test, and operating the quantum computing system based on the reconstructed calibration data, wherein operating the quantum computing system includes tuning the qubit in accordance with the determined value for the at least one qubit parameter.

2. The method of claim 1, wherein the de-corrupting autoencoder is operable to perform operations, the operations comprising:

encoding, by the one or more computing devices, the calibration data using an encoder network to generate a latent representation of the calibration data; and decoding, by the one or more computing devices, the latent representation of the calibration data using a decoder network to generate reconstructed calibration data.

3. The method of claim 2, wherein the encoder network and the decoder network each comprise a machine learned model trained at least in part using a corrupted training dataset.

4. The method of claim 3, wherein the corrupted training dataset comprises images having random speckle noise or masking noise.

5. The method of any of claim 2, wherein determining, by the one or more computing devices, the value for the at least one qubit parameter comprises determining, by the one or more computing devices, the value for the at least one qubit parameter based at least in part on the reconstructed calibration data.

6. The method of claim 1, wherein prior to processing, by the one or more computing devices, the calibration data using the de-corrupting autoencoder to generate reconstructed calibration data, the method comprises determining, by the one or more computing devices, that the calibration data has not previously been reconstructed using the de-corrupting autoencoder.

7. The method of claim 1, wherein determining, by the one or more computing devices, the value for the at least one qubit parameter comprises:

determining, by the one or more computing devices, the calibration data is corrupted;

in response to determining, by the one or more computing devices, the calibration data is corrupted, processing, by the one or more computing devices, the calibration data using the de-corrupting autoencoder to generate reconstructed calibration data; and performing, by the one or more computing devices, a calibration test on the reconstructed calibration data.

8. The method of claim 7, wherein the calibration data is determined to be corrupted using a signal-to-noise based classifier or a machine learned classifier model.

9. The method of claim 1, wherein the calibration data is represented in multiple dimensions.

10. The method of claim 9, wherein the calibration data is represented as a two-dimensional image.

11. The method of claim 1, wherein the data associated with a set of one or more qubit parameters for a qubit in a quantum computing system is represented by a directed graph, the directed graph comprising a node for each qubit parameter in the set of one or more qubit parameters and a directed edge for each dependency between qubit parameters in the set of one or more qubit parameters;

wherein determining, by the one or more computing devices, the value for the at least one qubit parameter is implemented according to a node ancestry ordering associated with the directed graph.

12. A quantum computing system, comprising:

a quantum system comprising a qubit;

one or more processors;

one or more memory devices, the one or more memory devices storing computer-readable instructions that when executed by the one or more processors cause the one or more processors to perform operations for calibrating the qubit, the operations comprising:

obtaining data associated with a set of one or more qubit parameters for the qubit, wherein obtaining the data associated with a set of one or more qubit parameters comprises calibrating the qubit using a quantum circuit;

obtaining calibration data associated with at least one qubit parameter in the set of one or more qubit parameters, wherein obtaining the calibration data includes at least measuring a value associated with the qubit;

performing a first calibration test on the calibration data;

determining the calibration data fails the first calibration test;

in response to determining the calibration data fails the first calibration test, processing the calibration data using a classical de-corrupting autoencoder to generate reconstructed calibration data;

performing a second calibration test on the reconstructed calibration data;

determining a value for the at least one qubit parameter when the reconstructed calibration data passes the second calibration test; and operating the quantum computing system based on the reconstructed calibration data, wherein operating the quantum computing system includes tuning the qubit in accordance with the determined value for the at least one qubit parameter.

13. The quantum computing system of claim 12, wherein the de-corrupting autoencoder is operable to perform operations, the operations comprising:

encoding the calibration data using an encoder network to generate a latent representation of the calibration data; and decoding the latent representation of the calibration data using a decoder network to generate reconstructed calibration data.

14. The quantum computing system of claim 13, wherein the encoder network and the decoder network each comprise a machine learned model trained at least in part using a corrupted training dataset.

15. The quantum computing system of any of claim 12, wherein prior to processing the calibration data using the de-corrupting autoencoder to generate reconstructed calibration data, the operations comprise determining that the calibration data has not previously been reconstructed using the de-corrupting autoencoder.

16. One or more tangible, non-transitory computer-readable media storing computer-readable instructions for execution by one or more processors to cause the one or more processors to perform operations for calibrating a qubit in a quantum computing system, the operations comprising:

obtaining data associated with a set of one or more qubit parameters for a qubit included in a quantum computing system, wherein obtaining the data associated with a set of one or more qubit parameters comprises calibrating the qubit using a quantum circuit;

obtaining calibration data associated with at least one qubit parameter in the set of one or more qubit parameters, wherein obtaining the calibration data includes at least measuring a value associated with the qubit;

performing a first calibration test on the calibration data;

determining the calibration data fails the first calibration test;

in response to determining the calibration data fails the first calibration test, processing, the calibration data using the de-corrupting autoencoder to generate reconstructed calibration data;

performing a second calibration test on the reconstructed calibration data;

determining the value for the at least one qubit parameter based at least in part on the reconstructed calibration data when the reconstructed calibration data passes the second calibration test; and operating the quantum computing system based on the reconstructed calibration data, wherein operating the quantum computing system includes tuning the qubit in accordance with the determined value for the at least one qubit parameter.

17. The non-transitory computer-readable media of claim 16, wherein the de-corrupting autoencoder is operable to perform operations, the operations comprising:

encoding the calibration data using an encoder network to generate a latent representation of the calibration data; and decoding the latent representation of the calibration data using a decoder network to generate reconstructed calibration data.

18. The non-transitory computer-readable media of claim 17, wherein the encoder network and the decoder network each comprise a machine learned model trained at least in part using a corrupted training dataset.

19. A method for operating a quantum computing system, comprising:

calibrating one or more qubit parameters of the quantum computing system according to the method of claim 1 to generate calibrated qubit parameters; and operating the quantum computing system using the calibrated qubit parameters to implement one or more quantum computing circuits.

20. The one or more tangible non-transitory computer-readable media storing computer-readable instructions of claim 16, wherein the calibration data is represented in multiple dimensions.

* * * * *